United States Patent [19]

Behn

[11] 4,161,774

[45] Jul. 17, 1979

[54] REGENERABLE ELECTRIC WOUND CAPACITOR WHICH IS DIVIDED INTO A PLURALITY OF SUB-CAPACITANCES

[75] Inventor: Reinhard Behn, Munich, Fed. Rep. of Germany

[73] Assignee: Siemens Aktiengesellschaft, Berlin & Munich, Fed. Rep. of Germany

[21] Appl. No.: 832,344

[22] Filed: Sep. 12, 1977

[30] Foreign Application Priority Data

Sep. 13, 1976 [DE] Fed. Rep. of Germany ....... 2641182

[51] Int. Cl.² .............................................. H02M 3/18
[52] U.S. Cl. ...................................... 363/59; 361/323
[58] Field of Search ..................................... 363/59–61; 361/323, 304, 306, 330, 307, 303, 273

[56] References Cited

U.S. PATENT DOCUMENTS

| | | | |
|---|---|---|---|
| 3,040,415 | 6/1962 | Rayburn | 361/323 X |
| 3,641,640 | 2/1972 | Rayburn | 361/323 X |
| 3,857,074 | 12/1974 | Heywang et al. | 361/307 |

FOREIGN PATENT DOCUMENTS 7403572 6/1974 Fed. Rep. of Germany.

Primary Examiner—William M. Shoop
Assistant Examiner—Peter S. Wong
Attorney, Agent, or Firm—Hill, Van Santen, Steadman, Chiara & Simpson

[57] ABSTRACT

A paper capacitor is disclosed of simple construction and suitable for use in voltage multiplier cascades. The paper capacitor has an interior series circuit formed by regenerably thin coatings and coatings with a high surface conductivity which overlap one another in an axial direction and have dielectric films therebetween. At least one covering layer is formed from the coatings of high surface conductivity and the corresponding dielectric film. Connection wires are sealed into the coatings of high surface conductivity and corresponding dielectric film.

12 Claims, 3 Drawing Figures

REGENERABLE ELECTRIC WOUND CAPACITOR WHICH IS DIVIDED INTO A PLURALITY OF SUB-CAPACITANCES

BACKGROUND OF THE INVENTION

1. Field of the Invention

The present invention relates to an electrical regenerable wound capacitor which is divided into a plurality of sub-capacitances, in particular for use in voltage multiplier cascades. The wound capacitor contains a series arrangement of metal coatings and more than two connection wires. The coatings are arranged between dielectric films, and at least one coating overlaps at least two side-by-side coatings from which it is separated by a dielectric film. At least one of the connection wires projects from the winding between the end side walls of the capacitor at the periphery thereof.

2. Description of the Prior Art

A capacitor of this type is disclosed in claim one of the German Utility Pat. No. b 7,403,572, in which coatings are contacted by inserted connection wires, and where the connection wires are passed through covering films and pressed onto the coatings by the winding pressure. The production of capacitors of this type is complicated and leads to a weakening at certain areas of the dielectric. A reliable contacting cannot be readily achieved since only a few layers can be used to support the wires if the winding is not to be excessively thick.

SUMMARY OF THE INVENTION

It is an object of this invention to provide a regenerable capacitor which is of simple construction and which is suitable for use in voltage multiplier cascades, contains a plurality of sub-capacitances, and nevertheless is easy to contact.

This object is realized in accordance with the invention by providing a portion of the coatings as regenerably thin metallizations which are separated from one another by insulating film so as to be bonded by self substance. These thin metallizations are not electrically conductively connected to outer connection wires. They in each case overlap two side-by-side coatings arranged to be separated by insulating strips in the axial direction of the wound capacitor. These side-by-side coatings have, at least in the region of their outermost turns, a high surface conductivity. No regenerably thin coatings are arranged between at least the two outermost turns formed by the coatings of high surface conductivity and by dielectric films consisting of fusible synthetic material. At least one connection wire is fused into these dielectric films and coatings located outside the capacitive region, and is electrically conductively connected to a coating exhibiting a high surface conductivity.

The capacitor construction corresponding to the invention offers the advantage that the connection wires and the fusion thereof do not damage the capacitive region of the capacitor, and that the connection wires can be applied in a simple manner, e.g. by welding through use of two electrodes positioned on the connection wire. This construction results in a low space requirement with sufficient high voltage insulation. These advantages are also present with respect to U.S. Pat. No. 3,040,415, in which a connection wire is fused into a winding and pressed through a series of coatings, and in which for this reason the wire is fused into a region in which only one coating is present. Therefore this U.S. patent does not permit a series arrangement of coatings which is of simple construction and suitable for use in voltage multiplier cascades. If a capacitor corresponding to the U.S. patent is to be designed for high voltage, wide free-edge zones are necessary since, in spite of a local destruction of the dielectric and the coatings, the insulation must be ensured.

The capacitor corresponding to the invention advantageously possesses no end contact layers and has at least three connection wires which project out of the periphery of the winding. In this way it is possible to dispense with the cost of the end contact layers and the space requirement is less.

In order to prevent the connection wires from penetrating too deeply into the capacitor, preferably a heat-resistant insert film is additionally wound over the last capacitive turn and above this insert film there is arranged at least one turn of the coatings exhibiting a high surface conductivity. In this case the outer turn can be satisfactorily contacted without fusing the wire too far into the capacitor. The dielectric film consists of fusible synthetic material, preferably polyethylene terephthalate. This synthetic material can be connected in a particularly stable manner to the fused connection wire and serves as a flux agent, thus forming an alloy between the connection wire and coating which renders the contact particularly reliable.

An embodiment which has proved valuable in practice consists in providing the capacitor with a 20 mm thick dielectric film consisting of polyethylene terephthalate which is coated with metal strips having a surface conductivity of 15 mhos. The metal strips possess a width of 10 mm and insulating strips having a width of 4 mm are arranged between the metal strips. The wound capacitor contains an additional 20 mm thick dielectric film which is composed of polyethylene terephthalate and which is coated with metal strips which exhibit the same width but have a surface conductivity of only 0.3 mhos. A heat-resistant film composed of polyimide is wound over the capacitive region. All the coatings advantageously consist of aluminum since in such a case the contacting and the mechanical attachment can be achieved satisfactorily even when all the coatings are layers which have been produced by metal vapor deposition.

An expedient construction of the capacitor corresponding to the invention contains three capacitors connected in series respectively consisting of four capacitances also arranged in series. In this construction, every second coating is contacted from the surface area of the capacitor winding. It is suitable for use in a three-stage cascade such as is required in televisions.

In a further advantageous embodiment, the width of the insulating strip between the coatings is 4 mm, the covering width of the overlapping coatings is 3 mm, the film consisting of polyethylene terephthalate is 30 mm thick, and the capacitor is divided into four sub-capacitors arranged in series.

The coatings having a high surface conductivity can advantageously consist of metal foils. This is advisable for small capacitance values. For higher capacitance values it is advantageous if the coatings which are accessible from the periphery consist of thin metallizations which, in the region of the periphery of the winding, are reinforced by metal foils applied thereto. This embodiment is also advantageous for relatively thin dielectric film, whereas in the case of thicker dielectric films which can also be subject to a higher thermal load, it is more advantageous to use vapor-deposited coatings having a high surface conductivity. In order to provide a protection for the winding it is advantageous if at least the outermost turns thereof consist of a nonmetalized, fusible synthetic film. The latter also increases the resistance of the winding, and improves the support of the connection wires.

Capacitors corresponding to the invention are advantageously assembled to form an electric voltage multiplier cascade which, in addition to the capacitance, also contains diodes and possibly additional components. The connection wires of the diodes and of the additional components and wires possibly provided for interconnection are fused directly into the capacitors to the corresponding outer coatings and are connected to the latter by an alloy formation.

A capacitor corresponding to the invention can contain all of the capacitors of a cascade arranged directly in series. However, it can also contain only some of these capacitors if, for example, the winding is to be relatively short. In this situation the corresponding block of capacitors is interconnected by an outer wiring.

DESCRIPTION OF THE PREFERRED EMBODIMENTS

Figure 1:
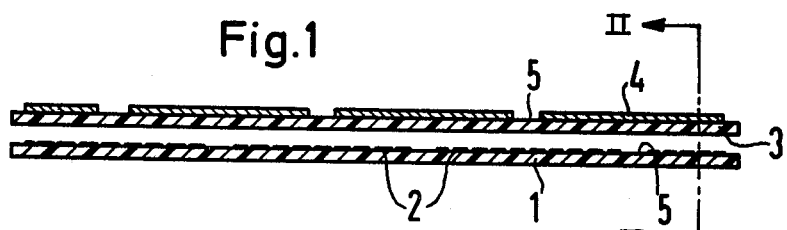
FIG. 1 illustrates a cross-sectional view taken transverse to a running or longitudinal direction of the synthetic films and metal coatings which are to be wound as a capacitor of this invention.
Figure 2:
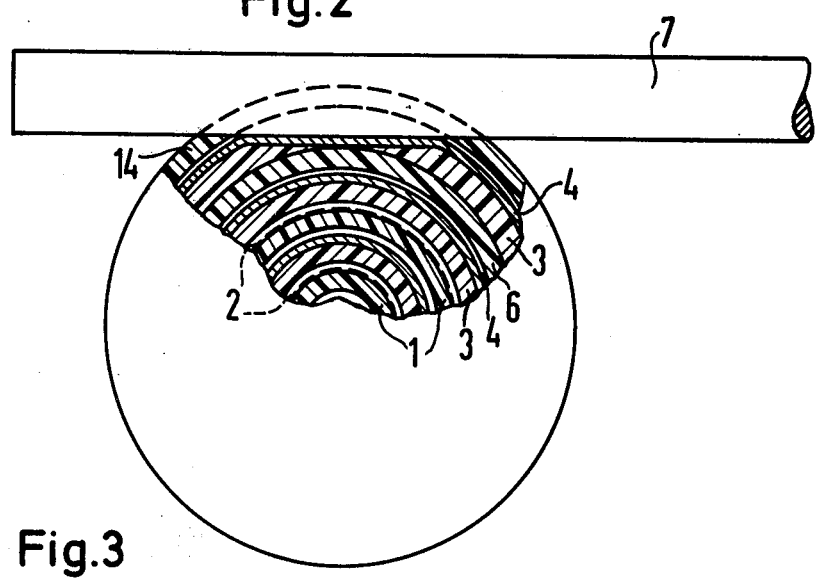
FIG. 2 illustrates a side view in partial section taken along section line II—II of FIG. 1 of the finished winding with a connection wire.

Regenerably thin metalizations 2 are applied to an insulating film 1. Coatings 4 exhibiting a high surface conductivity are applied to a further insulating film 3 composed of a fusible synthetic material. These coatings are arranged so as to be offset from the regenerable coatings 2, and are separated from one another, as are the regenerable thin metalizations 2, by insulating strips 5. In accordance with FIG. 2 this layer sequence is wound to form a capacitor. The insulating film 1 with the regenerable coatings 2 (illustrated as dashed lines) is cut off at an earlier point than the insulating film 3 with the coatings 4 of high surface conductivity. Over the capacitive region, i.e. at the end of the insulating film 1 having the regenerable coatings 2, there is wound an insert film 6 consisting of a synthetic material which has a high melting point and is heat-resistant. Over this insert film 6 there is arranged at least one turn of the insulating film 3 with the coatings 4 of high surface conductivity. The capacitor is protected by a nonmetalized covering film 14 which consists of fusible synthetic material, preferably polyethylene terephthalate. Through the covering film 14 and into the insulating film 3 there is fused a connection wire 7 which is electrically conductively connected to the coatings 4. The connection wire 7 can penetrate through the corresponding coating 4 at particular points such that an especially reliable contacting and firm fixing of the connection wire results, in particular when polyethylene terephthalate films are used as insulating films 3. The synthetic material of the insulating film 3 has penetrated the coating 4, partially surrounds the connection wire 7, and thus produces a firm attachment (not illustrated in FIG. 2).

Figure 3:
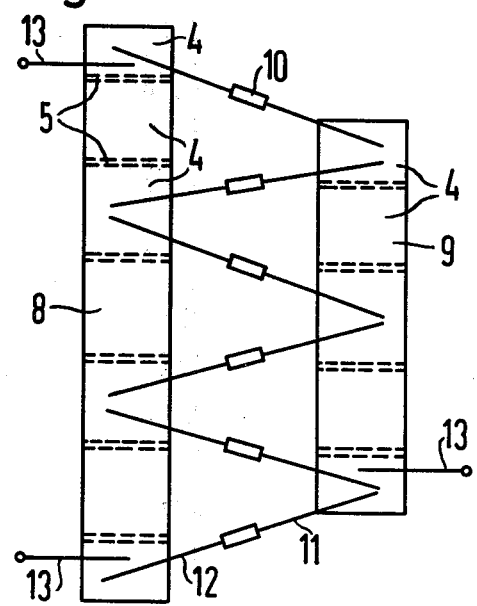
FIG. 3 illustrates a high voltage cascade produced from capacitors corresponding to the invention.

In FIG. 3 a capacitor 8, which is divided into three sub-capacitances, and a capacitor 9, which is divided into two subcapacitances, with six diodes 10, are connected to form a three-stage voltage multiplier cascade. The connection wires 11 and 12 of the diodes and the outer terminals 13 of the cascade are directly fused into the wound capacitors and are electrically conductively connected to the corresponding coatings. The connection wires 11 and 12 of the diodes 10 can be fused into the capacitor blocks 9 and 8 in different directions, provided they form an electrically conductive connection only with the corresponding metal coating 4 exhibiting a high conductivity, but not with adjacent metal coatings 4. Due to the high voltage which is applied during operation, the wires also cannot be allowed to be fused into the capacitors in the region of the insulating strips 5 between the coatings 4 of high conductivity, although they may be fused in the region of the insulating strips 5 between the regenerably thin coatings 2. Accordingly, when the coatings 4 have a width of 10 mm, sufficient play is available for automatic assembly using low-cost automatic equipment.

I claim as my invention:

1. An electrical regenerable wound capacitor which is divided into a plurality of series connected subcapacitances for use in voltage multiplier cascades, comprising:
   (a) a first dielectric film having a plurality of spaced strips of first regenerably thin metalization coatings attached thereto, insulating means being positioned between the spaced strips;
   (b) a second dielectric film over the first dielectric film and thin metalization coatings, a plurality of spaced strips of second metal coatings separated by insulating means, at least one strip of the second coatings laterally positioned to overlap at least two side-by-side strips of the first coatings to form a series arrangement of coatings as series connected subcapacitances;
   (c) said first and second dielectric films and associated first and second coatings being wound to form a capacitive region of the wound capacitor;
   (d) at least two outermost turns of the second dielectric film and second coatings wherein said second coating has a relatively higher surface conductivity than that of said first regenerably thin metalization coatings, no first coatings being arranged between the two outermost turns of the second coatings and dielectric film;
   (e) at least one outer connection wire fused into at least one of said outermost turns of second dielectric and second coatings of high surface conductivity, said connection wire lying external to the capacitive region and being positioned to project from a periphery between end sidewalls of the wound capacitor; and
   (f) said first regenerable thin coatings not being electrically connected to any outer connection wires.

2. A wound capacitor as claimed in claim 1, characterized in that the capacitor has no end contact layers and that at least three connection wires project from the wound capacitor periphery.

3. A wound capacitor as claimed in claim 1, characterized in that a heat-resistant insert film is also wound over a last capacitive turn in the capacitive region and that over this insert film there is arranged at least one turn of said second coatings of high surface conductivity.

4. A wound capacitor as claimed in claim 1, characterized in that the second dielectric film comprises a fusible synthetic material composed of polyethylene terephthalate.

5. A wound capacitor as claimed in claim 1, characterized in that said second dielectric film has a thickness of 20 mm and comprises polyethylene terephthalate, said second coatings of higher surface conductivity having a surface conductivity of 15 mhos, and a width of 10 mm, said insulating strips having a width of 4 mm arranged between the second coatings of higher surface conductivity, said first dielectric film having a width of 20 mm and comprising polyethylene terephthalate and which is coated with said first regenerably thin metalization coatings which have the same width but possess a surface conductivity of only 0.3 mhos, and a heat-resistant film comprising polyimide wound over the capacitive region of the wound-capacitor.

6. A wound capacitor as claimed in claim 1, characterized in that the second coatings of a higher surface conductivity comprise metal foil strips.

7. A wound capacitor as claimed in claim 1, characterized in that the portion of the second coatings of high surface conductivity which are accessible from the periphery consist of thin metalizations which, in the region of the periphery of the wound capacitor, are reinforced by metal foils applied thereto.

8. A wound capacitor as claimed in claim 1, characterized in that an outermost turn is provided comprising a non-metalized, fusible synthetic covering film.

9. The capacitor of claim 1 wherein the first dielectric film and first coating are cut short so as to not extend between the two outermost windings formed by the second dielectric film and second coating.

10. The capacitor of claim 1 wherein the connection wire may be fused into contact with the second coating of high surface conductivity and project from the periphery inwardly of the end sidewalls and anywhere around the periphery.

11. A voltage multiplier cascade comprising:
(a) first and second wound capacitors, each wound capacitor being divided into a plurality of series connected sub-capacitances, each wound capacitor comprising
 (i.) a first dielectric film having a plurality of spaced strips of first regenerably thin metalized coatings attached thereto, insulating means being positioned between the spaced strips;
 (ii.) a second dielectric film over the first dielectric film and thin metalization coatings, a plurality of spaced strips of second metal coatings separated by insulating means, at least one strip of the second coatings laterally positioned to overlap at least two side-by-side strips of the first coatings to form a series arrangement of coatings as series connected sub-capacitances;
 (iii.) said first and second dielectric films and associated first and second coatings being wound to form a capacitive region of the wound capacitor;
 (iv.) at least two further outermost turns of the second dielectric film and second coatings wherein said second coating has a relatively higher surface conductivity than that of said first regenerably thin metalization coatings, no first coatings being arranged between the two outermost turns of the second coatings and dielectric film;
 (v.) outer connection wires fused into at least one of said outermost turns of second dielectric film and a plurality of strips of said second coatings of high surface conductivity, said connection wires lying external to the capacitive region and being positioned to project from a periphery between end sidewalls of the wound capacitor; and
 (vi.) said first regenerable thin coatings not being electrically connected to any outer connection wires;
(b) a plurality of diodes connected via said connection wires between the first and second wound capacitors to form a voltage multiplier cascade, some of said wound capacitor connection wires serving as cascade connection terminals to external circuitry.

12. An electrical regenerable wound capacitor which forms a plurality of series connected sub-capacitances, comprising:
(a) a first dielectric film supporting a plurality of laterally spaced first thin regenerable metalization strips insulated from one another;
(b) a second dielectric film over the first film supporting a plurality of laterally spaced second metal strips thicker than said first strips, at least one of said second strips overlapping two adjacent first strips so as to form two series connected capacitors;
(c) said first and second dielectric films and associated strips being wound to form a capacitive region of the wound capacitor;
(d) the first film and first coating being cut short so as not to extend between two outermost turns of the second dielectric films and associated strips;
(e) at least one outer connection wire fused into and supported by said second dielectric film, said connection wire lying external to the capacitive region and being positioned to project from a periphery between end sidewalls of the wound capacitor; and
(f) said first regenerable strips not being electrically contacted to any outer connection wires.

* * * * *